United States Patent [19]

Reeves

[11] Patent Number: 5,033,375

[45] Date of Patent: Jul. 23, 1991

[54] CAN CRUSHER

[76] Inventor: Rudolph E. Reeves, 6650 Mariner Dr., Racine, Wis. 53406

[21] Appl. No.: 465,410

[22] Filed: Jan. 16, 1990

[51] Int. Cl.[5] .......................... B30B 1/00; B30B 15/06; F16F 1/08

[52] U.S. Cl. .................................... 100/265; 100/266; 100/295; 100/902; 267/166; 267/166.1

[58] Field of Search ............... 100/902, 265, 266, 268, 100/295, 35, 41; 267/166, 166.1; 446/26

[56] References Cited

U.S. PATENT DOCUMENTS

| | | | |
|---|---|---|---|
| D. 266,566 | 10/1982 | Schmid | D15/123 |
| D. 268,761 | 4/1983 | Brown | D15/123 |
| 1,661,374 | 3/1928 | Lacey | 100/211 |
| 2,466,907 | 4/1949 | Nadolny et al. | 153/105 |
| 2,638,957 | 5/1953 | Danielson | 153/10.5 |
| 3,667,386 | 6/1972 | Workman | 100/233 |
| 3,776,129 | 10/1973 | Carlson | 100/98 |
| 3,988,978 | 11/1976 | Flick | 100/35 |
| 4,062,283 | 12/1977 | Kaminski | 100/218 |
| 4,133,261 | 1/1979 | Belfils | 100/280 |
| 4,143,595 | 3/1979 | Carlson | 100/280 |
| 4,168,661 | 9/1979 | Wigdahl | 100/218 |
| 4,188,875 | 2/1980 | Fabbri et al. | 100/218 |
| 4,208,961 | 6/1980 | Okajima | 100/233 |
| 4,212,242 | 7/1980 | Willis | 100/233 |
| 4,228,734 | 10/1980 | Parrish | 100/245 |
| 4,292,891 | 10/1981 | Shelley | 100/193 |
| 4,333,395 | 6/1982 | Kurtz | 100/233 |
| 4,333,396 | 6/1982 | Longnecker | 100/233 |
| 4,333,397 | 5/1982 | Modes | 100/233 |
| 4,345,519 | 8/1982 | Sabino | 100/215 |
| 4,358,142 | 11/1982 | Montalvo | 294/19 R |
| 4,383,480 | 5/1983 | Jerden | 100/98 |
| 4,417,512 | 11/1983 | Engelke | 100/266 |
| 4,459,905 | 7/1984 | Wilson | 100/35 |
| 4,475,449 | 10/1984 | Gianelo | 100/42 |
| 4,517,892 | 5/1985 | Meisner | 100/292 |
| 4,532,861 | 8/1985 | Gisselberg, III | 100/233 |
| 4,561,351 | 12/1985 | Ader | 100/233 |
| 4,606,266 | 8/1986 | Hyman, Sr. | 100/233 |
| 4,653,398 | 3/1987 | Fowler | 100/233 |
| 4,682,539 | 7/1987 | Bramblett et al. | 100/265 |

FOREIGN PATENT DOCUMENTS

| | | | |
|---|---|---|---|
| 721059 | 11/1965 | Canada | 100/56 |

*Primary Examiner*—Jimmy G. Foster
*Assistant Examiner*—M. D. Patterson
*Attorney, Agent, or Firm*—Law Firm of Peter N. Jansson, Ltd.

[57] ABSTRACT

An improved can crusher device including a coil spring, forming a chamber, attached at its upper end to a substantially flat disk. When force is applied to the disk a can placed within the chamber is crushed. Preferrably, the coil spring is flared progressively toward its lower end to confer stability to the device during the can crushing operation and promote optimal can compression. The preferred disk has a peripheral edge and annular wall on its lower surface which work with the coil spring to hold the can in place. One preferred embodiment has gaps in the annular wall to release accumulated air pressure. When not in use, the can crusher may be compacted for storage or transportation with holders positioned through the disk and under the coil. The device is light-weight, yet durable, promotes quick, efficient can crushing, and enhances the economic virtues associated with recycling empty cans.

14 Claims, 4 Drawing Sheets

CAN CRUSHER

FIELD OF THE INVENTION

This invention is related generally to can crusher devices and, more particularly, to crushing mechanisms which provide efficient and optimal can compression.

BACKGROUND OF THE INVENTION

Over the last half-century, mass production of consumer goods and sophisticated marketing techniques have spawned an increasing use of disposable, no-return containers. Notable among these are light-weight metal cans for soft drinks and other beverages.

In the past, low production costs and abundant resources rendered the cans non-returnable. Without to various means of disposal. More recently, however, economic and environmental concerns have fostered the reuse or "recycling" of these cans.

Given the wide-spread use of cans, recycling them invariably involves the storage and transport of large quantities, by either individual or industrial recyclers. A problem arises in that once emptied of its contents, a can occupies the same volume as when full. The result is inefficient storage and transport of "empties." The economy realized through recycling is enhanced if the empties have a reduced collective volume. This is accomplished at the individual recycling level by crushing each can and compacting its mass.

The search for an efficient, economical crushing device for individual recyclers has been a long-standing concern in the art. Most devices utilize a base plate or anvil-type surface against which cans are compressed. A pivotally-mounted jaw or a lever, hinged and fastened to a spring, is attached to an end of the base plate, such that a swinging movement of the jaw or lever, toward the plate crushes a can placed therebetween. Some examples of such well-known can crushing devices are disclosed in U.S. Pat. Nos. 2,466,907, 3,776,129 and 4,606,266.

However, prior art has associated with it a number of significant problems and deficiencies. Most are related to the crushing mechanisms of the can crusher devices currently used.

One major problem is that devices of the prior art, which include the crusher devices described above, are heavy and cumbersome. Such devices are comprised of many individual parts, any of which may easily break or malfunction. Construction costs make these devices expensive relative to their ultimate use.

Another significant problem with certain devices of the prior art is that force used to crush a can is applied at a distance from it, making the crushing process inefficient. A number of difficulties arise from force applied in this way, including inadequate can compression, and lateral movement of the can away from the crushing mechanism.

In summary, a considerable number of drawbacks and problems exist in the art relating to can crusher devices. There is a need for an improved can crusher device to fully utilize the environmental and economic advantages associated with recycling.

OBJECTS OF THE INVENTION

It is an object of this invention to provide an improved can crusher device overcoming some of the problems and shortcomings of the prior art.

Another object of this invention is to provide an improved can crusher device which is light-weight, portable and compact, yet durable.

Another object of this invention is to provide an improved crushing mechanism for can crusher devices.

Another object of this invention is to provide an improved crushing mechanism for can crusher devices, such that the number of movable, component parts therein is reduced to a minimum.

Another object of this invention is to provide an improved crushing mechanism for can crusher devices, such that an external force is applied along the vertical axis of the can to be crushed.

Another object of this invention is to provide an improved crushing mechanism for can crushing devices such that lateral can movement during crushing is prohibited.

These and other important objects will be apparent from the descriptions of this invention which follow.

SUMMARY OF THE INVENTION

This invention is an improved can crusher device for use in the recycling of cans. It overcomes certain well-known problems and deficiencies, including those outlined above.

An important aspect of this invention is an improved crushing mechanism, including a preferred coil spring configuration. This inventive arrangement allows an individual to apply an external force along the vertical axis of a can, promoting optimal can compression while restricting lateral movement. The design of the crushing mechanism and the improved can crusher provides for a minimal number of movable parts. This mechanistic simplicity assures long-term use and durability.

This invention is a can crusher device including (1) an axially-aligned coil spring with a given cross-dimension, lower and upper ends, and an inner diameter, forming a chamber along the length thereof, and (2) means engaging the upper end of the coil and engageable by the human foot to apply an external, downward pressure to bring the ends of the coil together and reduce the volume of the chamber.

The engaging means is a horizontal disk, which has flat upper and lower surfaces. In highly preferred embodiments, circular passages extend between the upper and lower surfaces. A peripheral edge extending downward attaches the disk to the coil spring. In highly preferred embodiments, the lower surface of the disk has an annular wall near the peripheral edge such that the wall and edge are substantially concentric. The wall and edge receive the top of an upright crushable can and prevent lateral movement of the can during crushing. In highly preferred embodiments, the disk has means to facilitate the release of air pressure developed during the crushing process. Gaps in the annular wall relieve pressure accumulated between the lower surface of the disk and the top of an upright can as force is exerted on the engaging means.

In highly preferred embodiments, the coil spring is substantially flared such that the chamber formed has a diameter which increases progressively towards its lower end. A flared arrangement stabilizes the spring during application of pressure on the engaging means. Bringing the ends of the coil spring together configures and arranges the spring in such way that the coils are substantially concentric, allowing optimal can compression.

The can crusher device is placed over a crushable can. Application of an external, downward force on the engaging means reduces the chamber volume and compresses the can to the extent allowed by the spring coil. Removal of the force recreates the chamber. The compressed can may then be removed and replaced with another simply by lifting the coil spring.

In highly preferred embodiments, the can crusher device may be made compact for storage. Vertically-aligned holders, positioned through the circular disk passages, extend from the disk to a point along the relaxed coil, approximately mid-way between its upper and lower ends. The holder tail is dimensioned to fit through a passage and angled such that it may be attached to the lower end of the coil. The holder head is substantially T-shape in cross-section such that it rests on the upper surface of the disk. When the holders are so positioned, external pressure on the disk brings the coil ends together, allowing the holders to engage the lower end of the coil and compact the can crusher when not in use.

As already noted, this invention has certain advantages. The use of a coil spring as part of the improved crushing mechanism affords it the advantage of being light-weight and portable compared to devices of the prior art. The improved crushing mechanism holds and crushes the can simultaneously, with a minimal number of movable parts. Assembly is efficient and, cost is significantly reduced. Durability is also enhanced.

The one-piece construction of the improved crushing mechanism allows application of an external, downward force along the vertical axis of a can. The peripheral edge, the annular wall, and the coil spring work together to hold the can in place and provide optimal can compression. The flared spring allows the coils to arrange themselves in a concentric manner when force is applied. Compression is, therefore, not limited by the stacking of individual coils.

When not in use, the can crusher may be stored or transported conveniently. The hook-like holders compact the coil spring, bringing the disk toward the lower end of the coil spring. Storage in this manner maintains coil spring strength and extends the functional lifetime of the can crusher.

DETAILED DESCRIPTIONS OF PREFERRED EMBODIMENTS

The figures illustrate an improved can crusher which is a preferred embodiment of this invention. The improved can crusher is light-weight, compact, yet durable, and enhances the benefits derived from recycling crushable cans.

Figure 1:
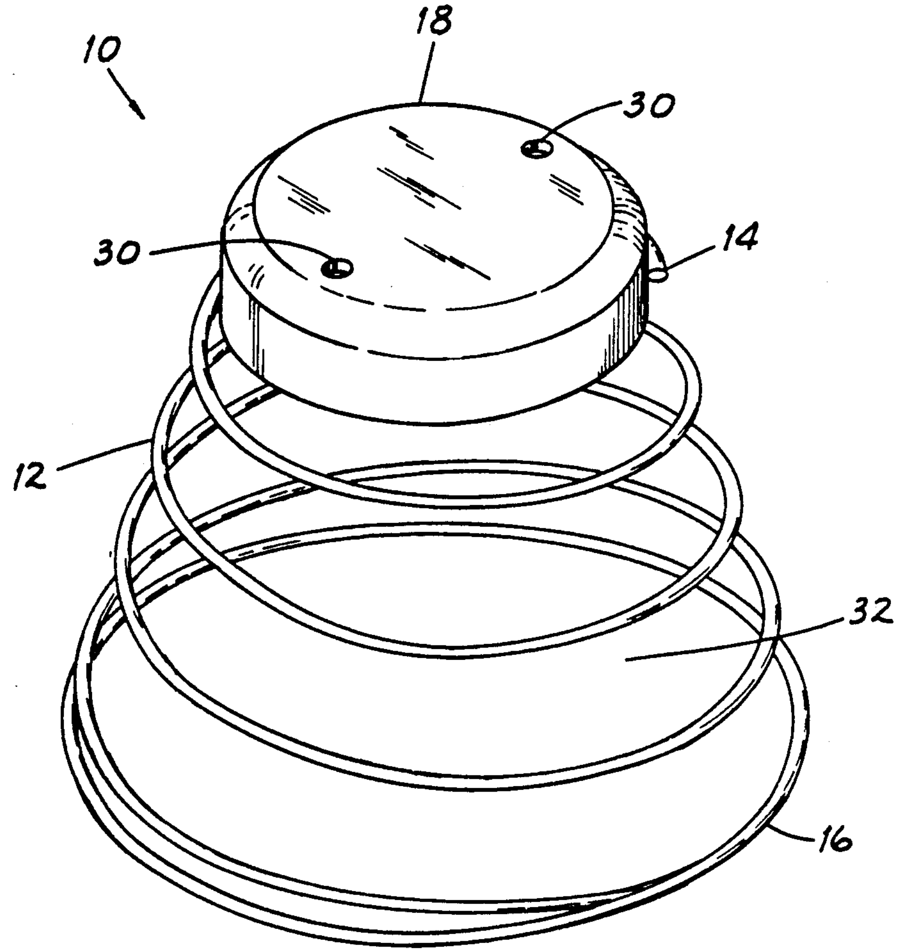
FIG. 1 is a full perspective view of the preferred improved can crusher in accordance with this invention.

The improved can crusher includes disk 18 and coil spring 12. As best shown in FIG. 1, coil spring 12 is attached at its upper end 14 to disk 18. In preferred embodiments, coil spring 12 has an inner diameter which defines chamber 32, and is substantially flared toward its lower end 16 such that the diameter of chamber 32 increases progressively toward its bottom end.

Figure 2:
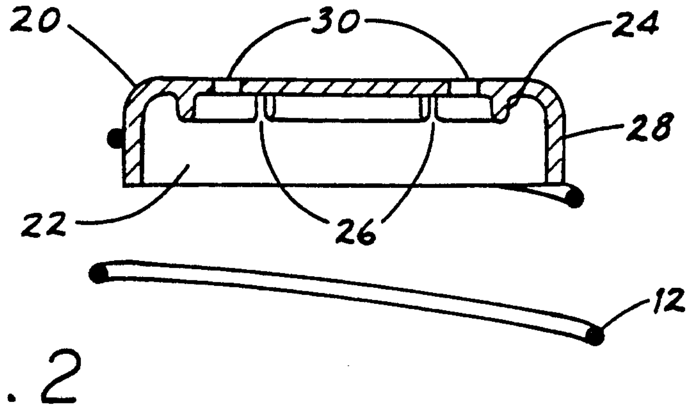
FIG. 2 is a fragmentary sectional view of the disk and upper end of the coil spring, taken along section 2-2 as indicated in FIG. 3.
Figure 3:
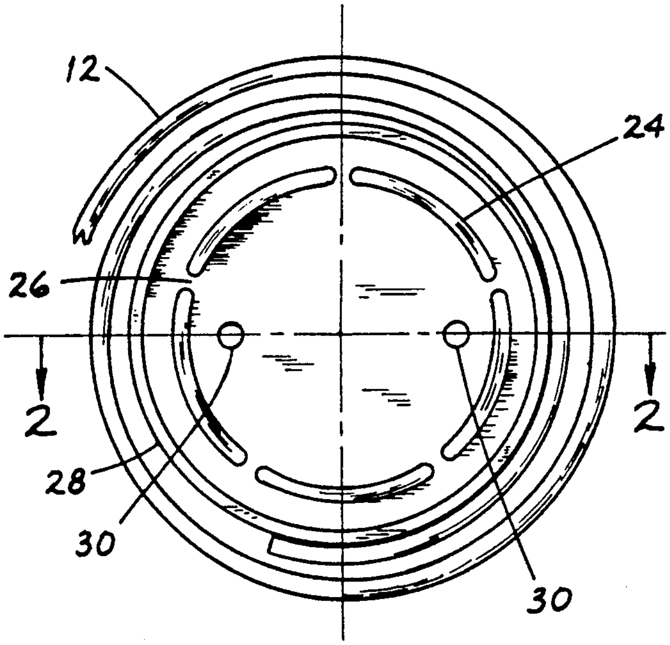
FIG. 3 is a bottom view of the disk and coil spring of the can crusher.

As shown in FIG. 2, disk 18 has an upper surface 20, a lower surface 22, and a peripheral edge 28, which is attached to the upper end of coil spring 12. In preferred embodiments, lower surface 22 has an annular wall 24 near peripheral edge 28. A crushable can is placed within chamber 32 such that disk 18 receives the top of the can between annular wall 24 and peripheral edge 28. As best shown in FIG. 3, annular gaps 26 facilitate release of pressure accumulated during the can crushing process.

Figure 6:
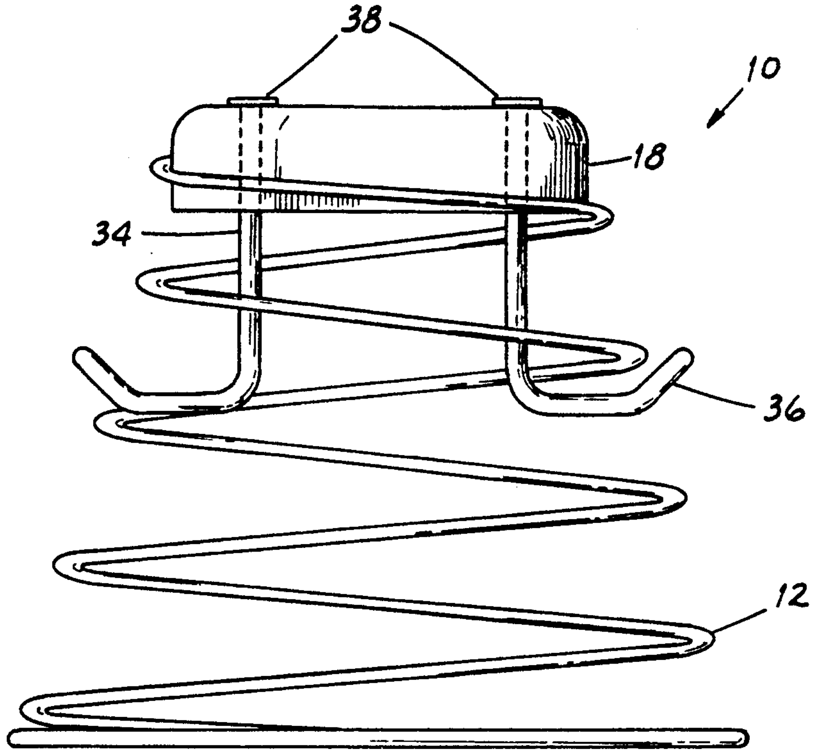
FIG. 6 is a face view of a can crusher with holders positioned through the disk and along the relaxed coil spring.

Storage and easy transport of can crusher 10 is accomplished through the use of holders 34. As shown in FIG. 6, disk 18 has two circular passages 30 between its upper and lower surfaces, 20 and 22, respectively. Holder tail 36 fits through passage 30, and is angled such that is may be attached to the lower end of coil spring 12. Holder head 38 is substantially T-shaped in cross-section such that it rests upon disk 18 as holder 34 is positioned within passage 30.

Figure 7:
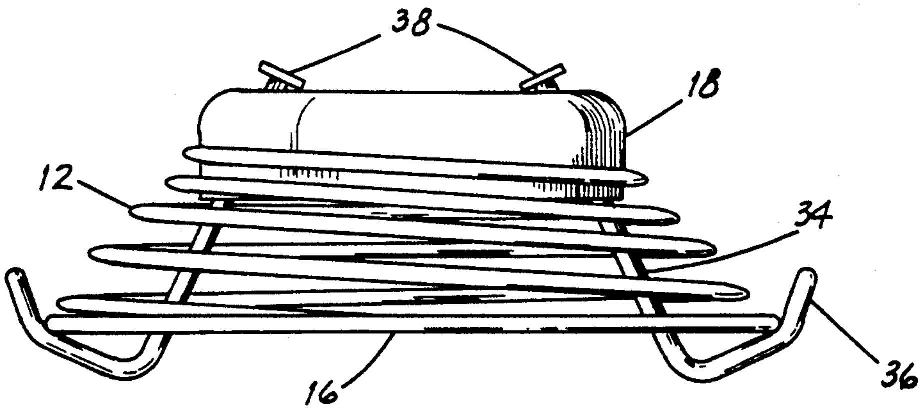
FIG. 7 is a face view of the compact can crusher.

As shown in FIG. 7, can crusher 10 may be compacted for storage or transport through the engagement of holders 34 with the lower end of coil spring 12. Upon the application of external pressure on disk 18, while holders 34 are positioned within passages 30, the upper and lower ends of coil spring 12 are brought together such that holder tails 36 may attach to lower coil end 16.

Figure 4:
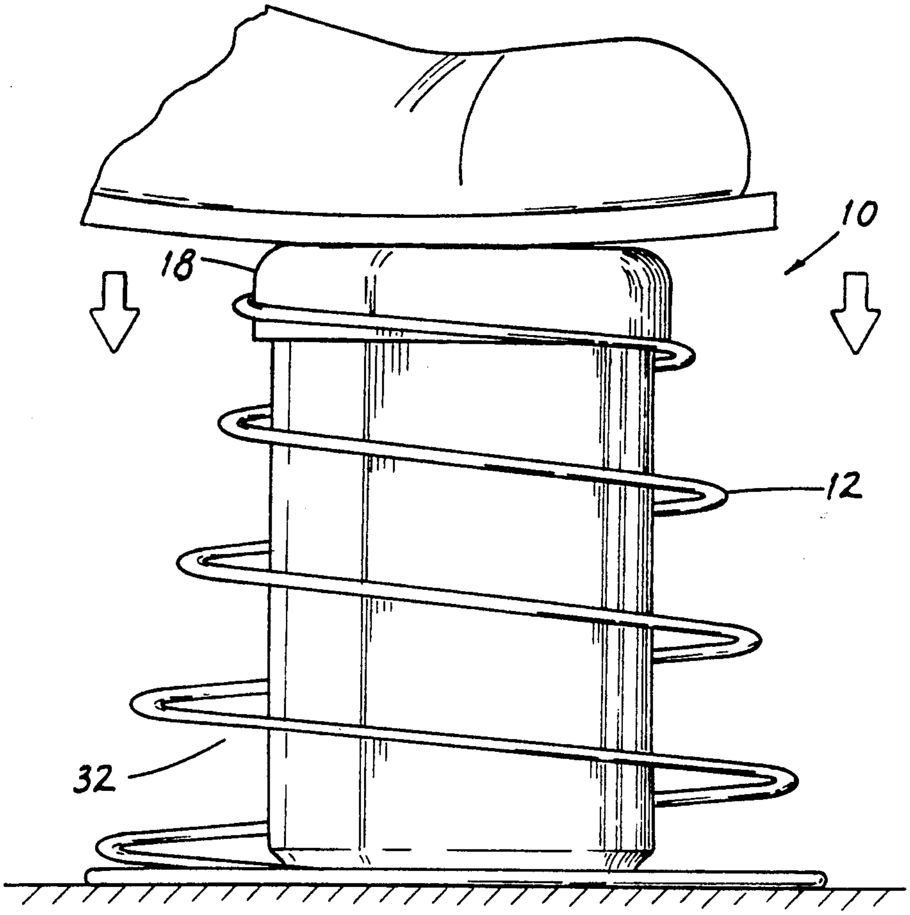
FIG. 4 is a face view of the can crusher, showing a crushable can within the chamber and a human foot about to apply force on the disk.
Figure 5:
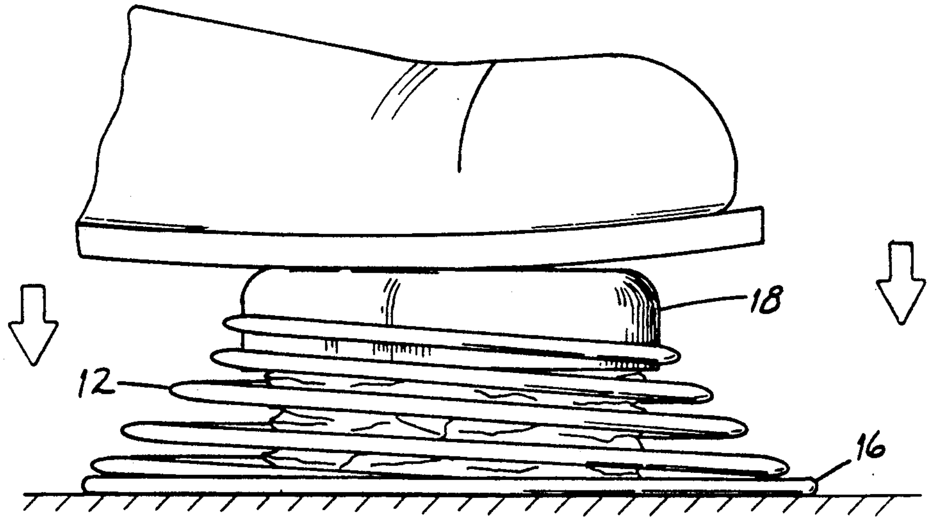
FIG. 5 is a face view of the can crusher, showing a can crushed within the chamber upon application of force on the disk.

As shown in FIGS. 4 and 5, can crusher 10 is placed over a crushable can such that the can is within chamber 32. Application of an external, downward pressure by the human foot on disk 18 brings the ends of coil spring 12 together and reduces the volume of chamber 32, thereby compressing the can. Removing the foot from disk 18 recreates chamber 32, and allows the can to be replaced by another.

Acceptable material choices for disk 18 and coil spring 12 of the invention will be apparent to those skilled in the art and aware of this invention. Coil spring 12 may be made using a variety of materials. A preferred material is coiled steel. Highly preferred is a No. 30 gauge OH Drill Rod 0287 coil, as it provides the desired degree of resiliency without demanding great strength to compress it.

While the principles of this invention have been described in connection with specific embodiments, it should be understood clearly that these descriptions are made only by way of example and are not intended to limit the scope of the invention.

I claim:

1. In a can crusher device of the type including a crushing member engageable with a can to crush the can, the improvement comprising:

an axially-aligned coil spring having lower and upper ends and an inner diameter, forming a chamber along the length thereof, said inner diameter of the coil spring all along the length of the spring being greater than the diameter of the can;

means engaging the upper end of the coil spring and engageable by the human foot to apply an external, downward pressure to bring the ends together and reduce the volume of the chamber, said pressure-application means having upper and lower surfaces and a peripheral edge which is connected to the coil spring upper end; and means on the lower surface of the pressure-application means forming at least one air channel radially therealong to facilitate release of air during crushing;

whereby a crushable can, placed inside the chamber when the coil spring is relaxed, is easily compressed upon application of an external, downward stepping force by the human foot on the pressure-application means, while fully containing the can under control, whereupon removal of the force relaxes the spring and recreates the chamber.

2. The can crusher of claim 1 wherein the pressure-application means is a substantially horizontal disk.

3. The can crusher of claim 2 wherein the peripheral edge of the disk has a downwardly-extending portion.

4. The can crusher of claim 2 wherein the lower surface of the disk has an annular wall near the peripheral edge such that said wall and edge are substantially concentric, whereby said disk receives the top of an upright crushable can, and whereby lateral movement of the can during crushing is prevented.

5. The can crusher of claim 4 wherein the air channel is a gap in the annular wall, whereby air pressure accumulated during application of force on the engaging means is released.

6. The can crusher of claim 1 wherein the coil spring is substantially flared, such that the diameter of said chamber increased progressively toward its lower end, whereby said spring is stabilized during application of pressure on the pressure application means.

7. The can crusher of claim 6 wherein the coil spring, when said ends are brought together, is configured and arranged such that the coils are substantially concentric, whereby optimal can compression is achieved.

8. In a can crusher device of the type including a crushing member engageable with a can to crush the can, the improvement comprising:

an axially-aligned coil spring having lower and upper ends and an inner diameter, forming a chamber along the length thereof, said inner diameter of the coil spring all along the length of the spring being greater than the diameter of the can;

means engaging the upper end of the coil spring and engageable by the human foot to apply an external, downward pressure to bring the ends together and reduce the volume of the chamber, said pressure-application means having upper and lower surfaces and a peripheral edge which is connected to the coil spring upper end; and means on the lower surface of the pressure-application means forming at least one air channel radially therealong to facilitate release of air during crushing;

whereby a crushable can, placed inside the chamber when the coil spring is relaxed, is easily compressed upon application of an external, downward stepping force by the human foot on the pressure-application means, while fully containing the can under control, whereupon removal of the force relaxes the spring and recreates the chamber; and means removably secured to the coil spring and pressure-application means to bring said ends substantially together;

whereby the can crusher device is made compact for storage between use.

9. The can crusher of claim 8 wherein the pressure-application means is a substantially horizontal disk having at least one passage extending therethrough.

10. The can crusher of claim 9 wherein the peripheral edge of the disk has a downwardly-extending portion.

11. The can crusher of claim 9 wherein the lower surface of the disk has an annular wall near the peripheral edge such that said wall and edge are substantially concentric, whereby said disk receives the top of an upright crushable can, and whereby lateral movement of the can during crushing is prevented.

12. The can crusher of claim 11 wherein the air channel is a gap in the annular wall, whereby air pressure accumulated during application of force on the engaging means is released.

13. The can crusher of claim 8 wherein:

said pressure-application means has a pair of passages therethrough; and the securing means is comprised of two substantially vertically-aligned holders freely positioned within said passages;

such that when the coil spring is relaxed the holders extend from the pressure-application means along the relaxed coil spring to a point between its upper and lower ends.

14. The can crusher of claim 12 wherein:

each holder has a head and tail;

the tail is dimensioned such that it passes freely through said passage and angled such that it may engage the lower end of the coil; and the head is dimensioned such that it engages the upper surface of the pressure-application means;

whereby the holders may engage the lower end of the coil and compact the can crusher.

* * * * *

UNITED STATES PATENT AND TRADEMARK OFFICE
CERTIFICATE OF CORRECTION

PATENT NO. : 5,033,375

DATED : July 23, 1991

INVENTOR(S) : Rudolph E. Reeves

It is certified that error appears in the above-identified patent and that said Letters Patent is hereby corrected as shown below:

Column 1, line 17, after "Without" insert the phrase --further use, they became part of the waste stream, subject--.

Col. 5, Claim 6, line 40, change "increased" to --increases--. In the same claim, the last line, change "pressure application" to --pressure-application--.

Col. 6, Claim 14, line 47, change "12" to --13--.

Signed and Sealed this

Third Day of November, 1992

*Attest:*

DOUGLAS B. COMER

*Attesting Officer*

*Acting Commissioner of Patents and Trademarks*